US012000641B2

(12) United States Patent
Tijani et al.

(10) Patent No.: US 12,000,641 B2
(45) Date of Patent: Jun. 4, 2024

(54) THERMOACOUSTIC DEVICE

(71) Applicant: Nederlandse Organisatie voor toegepast-natuurwetenschappelijk Onderzoek TNO, 's-Gravenhage (NL)

(72) Inventors: Moulay El Hassan Tijani, Petten (NL); Jan Aiso Lijcklama à Nijeholt, Petten (NL)

(73) Assignee: Nederlandse Organisatie voor toegepast-natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/766,774

(22) PCT Filed: Oct. 8, 2020

(86) PCT No.: PCT/EP2020/078327
§ 371 (c)(1),
(2) Date: Apr. 6, 2022

(87) PCT Pub. No.: WO2021/069617
PCT Pub. Date: Apr. 15, 2021

(65) Prior Publication Data

US 2023/0133558 A1 May 4, 2023

(30) Foreign Application Priority Data

Oct. 8, 2019 (EP) .................................... 19202020

(51) Int. Cl.
*F25B 9/14* (2006.01)
*F02G 1/043* (2006.01)

(52) U.S. Cl.
CPC .............. *F25B 9/145* (2013.01); *F02G 1/043* (2013.01); *F25B 2309/1402* (2013.01); *F25B 2309/1405* (2013.01); *F25B 2309/1409* (2013.01)

(58) Field of Classification Search
CPC .............. F25B 9/145; F25B 2309/1402; F25B 2309/1405; F25B 309/1409; F02G 1/043
See application file for complete search history.

(56) References Cited

U.S. PATENT DOCUMENTS

| | | | | |
|---|---|---|---|---|
| 11,333,403 B2 * | 5/2022 | Fukaya | F25B 9/002 | |
| 2004/0093865 A1 * | 5/2004 | Weiland | F02G 1/0435 | 60/520 |

FOREIGN PATENT DOCUMENTS

WO 2014/043790 A1 3/2014

* cited by examiner

*Primary Examiner* — Lionel Nouketcha
(74) *Attorney, Agent, or Firm* — N.V. Nederlandsch Octrooibureau

(57) ABSTRACT

A thermoacoustic device includes a process volume which is filled with a working fluid through which the acoustic wave propagates. The thermoacoustic device further includes an acoustic network comprising a tubular loop configured with a passage providing an opening in the loop and configured as acoustic circuit provided with a compliance volume, a thermo-acoustic core and an inertance volume. Within the loop, the thermoacoustic core is at a first side thereof adjacent to the passage at a first path length through the loop, and at its second side, opposite to the first side, the thermoacoustic core is at a second path length from the passage. The thermoacoustic device includes within the loop a spring-type partitioning element that is configured to close off the cross-section of the tube and to be impermeable for the working fluid while allowing transmission of pressure waves in the working fluid through the spring-type partitioning element.

14 Claims, 4 Drawing Sheets

Fig. 1 --Prior Art--
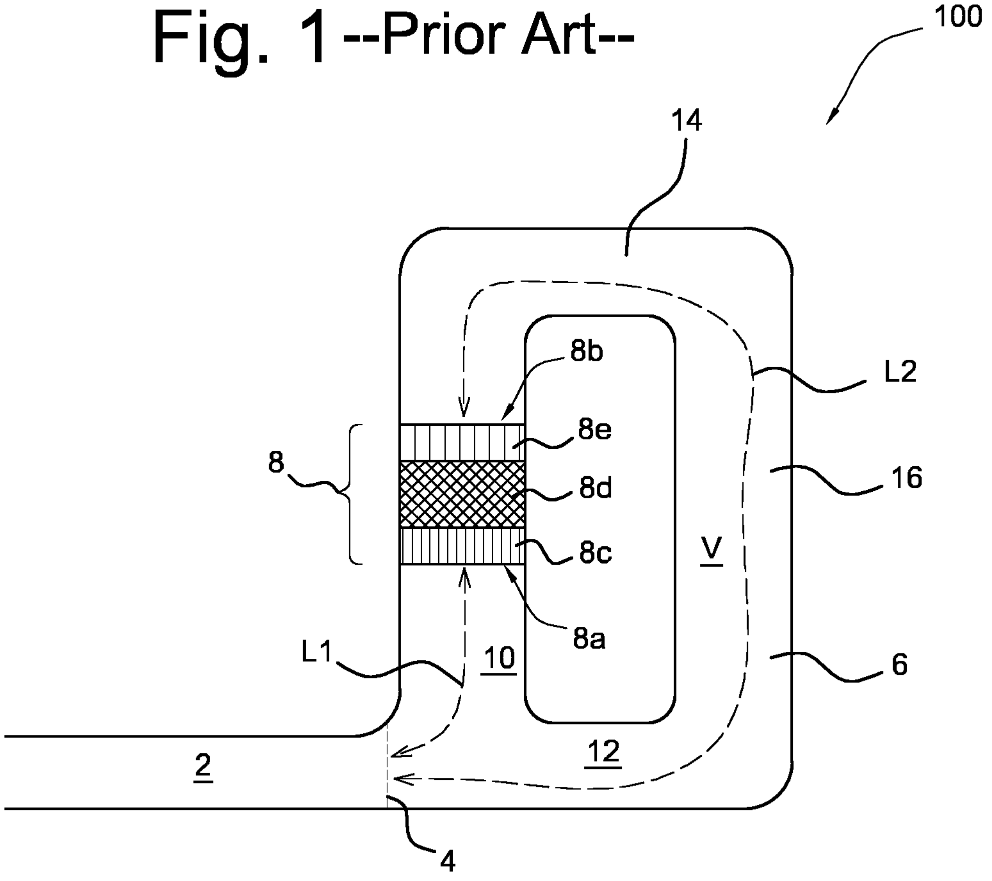
Fig. 2
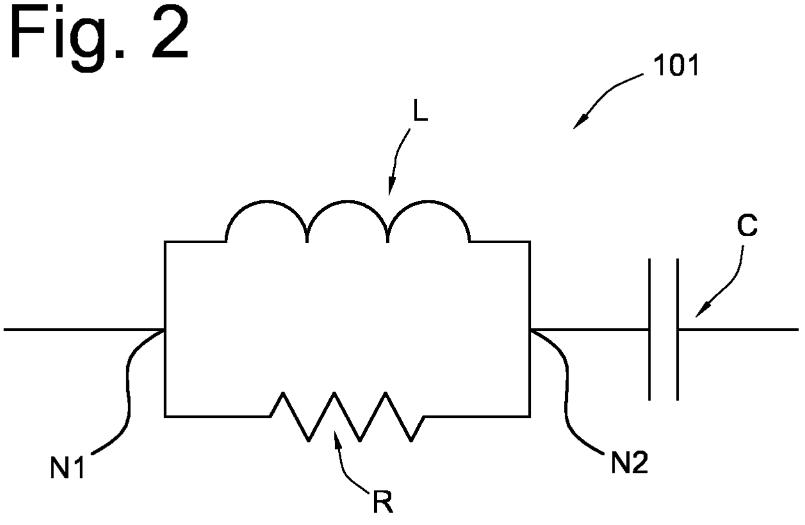

THERMOACOUSTIC DEVICE

FIELD OF THE INVENTION

The present invention relates to a thermoacoustic device. Also, the invention relates to a method for manufacturing such a thermoacoustic device.

BACKGROUND

A traveling wave thermoacoustic device consists in general of a regenerator unit or thermoacoustic core, comprising a regenerator and two heat exchangers, a feedback loop, and a pressure vessel holding a gas volume and that houses all components. The regenerator is arranged between the two heat exchangers. The heat exchangers are configured to transfer heat to or from the thermoacoustic device. Within the thermoacoustic device a conversion process between acoustic power and thermal power, and vice versa, takes place in the regenerator. A thermoacoustic device can be configured as an engine or as a heat pump.

The performance of such a thermoacoustic device can be characterized by two parameters: efficiency of the conversion process and power density. An ideal thermoacoustic device has both a high efficiency and a high power density. However, this combination is not always feasible.

Acoustic power is amplified or attenuated by a temperature ratio across the regenerator unit generated by a temperature difference between the two heat exchangers. In addition, an acoustic circuit is provided within the thermoacoustic device, which is characterized by a compliance and an inertance (feedback inertance).

A highest efficiency for the conversion in the thermoacoustic device can be obtained with a high resistance at the regenerator unit, which results in low gas velocities in the regenerator unit (low flow losses) and a small phase difference (about 0°) between velocity and pressure of the gas flowing through the regenerator unit. In order to obtain this traveling wave phasing, the magnitude of an impedance of the gas in the feedback inertance should be small compared to the resistance at the regenerator unit.

The power of the thermoacoustic device is controlled by a velocity of gas through the regenerator unit, while keeping all other parameters constant (geometry, average pressure, drive ratio, frequency, working medium). Increasing the compliance of the gas volume will lead to higher volume velocities but also to larger power losses. In fact, acoustic losses in the regenerator are proportional to the square of the velocity of the gas.

The preferred solution would be a thermoacoustic system with high volume velocities through the regenerator unit, without compromising the efficiency too much. In addition, the solution should not lead to prohibitively large costs associated with large gas volumes or large components.

U.S. Pat. No. 6,032,464 describes a traveling-wave device that is provided with the conventional moving pistons eliminated. Acoustic energy circulates in a direction through a fluid within a torus. A side branch may be connected to the torus for transferring acoustic energy into or out of the torus. A regenerator is located in the torus with a first heat exchanger located on a first side of the regenerator downstream of the regenerator relative to the direction of the circulating acoustic energy; and a second heat exchanger located on an upstream side of the regenerator. A mass flux suppressor is located in the torus to minimize time-averaged mass flux of the fluid.

It is an object of the present invention to overcome or mitigate one or more e disadvantages from the prior art.

SUMMARY OF THE INVENTION

The object is achieved by a thermoacoustic device for transfer of energy by an acoustic wave, comprising a process volume, the process volume being filled with a working fluid through which the acoustic wave propagates, comprising: an acoustic network comprising a loop configured with a passage; the loop being a tube configured as acoustic circuit provided with a compliance volume, an inertance volume, and a thermoacoustic core; the passage providing an opening in the loop spaced apart from the thermoacoustic core, wherein the loop connects the thermoacoustic core and the passage via two separate paths; wherein a first side of the thermoacoustic core is at a first path length from the passage in one of the two paths, and a second side of the thermoacoustic core is at a second path length in the other of the two paths; wherein the thermoacoustic device comprises a spring-type partitioning element within the loop; the spring-type partitioning element being configured to close off the cross-section of the tube and to be impermeable for the working fluid while allowing transmission of pressure waves in the working fluid through the spring-type partitioning element.

According to the invention, a spring-type partitioning element, i.e., a partition comprising an element with mechanical properties defined by a spring constant thereof, hereafter referred to as a (elastic or mechanical) spring is placed in the acoustic circuit near the thermoacoustic core (or regenerator unit). The spring enforces larger volume flows through the regenerator without adding gas volume to the system.

The position of the spring-type partitioning element should be near the thermoacoustic core to be effective. Besides increasing the volume velocities and therewith power density, the spring-type partitioning element also improves the phasing between pressure and velocity of the gas in the regenerator and therefore has a beneficial effect on the efficiency as well. The spring-type partitioning element can also be used to suppress DC flow in the travelling wave engine or heat pump. Therefore, a jet pump or membrane can be omitted which will simplify the system and lower its costs.

Convective heat losses in the thermal buffer tube of an engine or heat pump will be lowered by the additional thermal resistance of the partitioning element. This will lead to a further increase of the system efficiency.

It has to be understood that the spring element can be any type of spring; including cylindrical spring, conical spring, wave spring, flexure bearing, or any type of elastic membrane.

The present invention also relates to a method for manufacturing a thermoacoustic device in accordance with claim 16.

Advantageous embodiments are further defined by the dependent claims.

BRIEF DESCRIPTION OF DRAWINGS

The invention will be explained in more detail below with reference to drawings in which illustrative embodiments thereof are shown. The drawings are intended exclusively for illustrative purposes and not as a restriction of the inventive concept. The scope of the invention is only limited by the definitions presented in the appended claims.

FIG. 1 shows a cross-section of a thermoacoustic device in accordance with the prior art;

FIG. 2 shows an impedance analogy of the thermoacoustic device in accordance with the prior art;

DETAILED DESCRIPTION OF EMBODIMENTS

Figure 3:
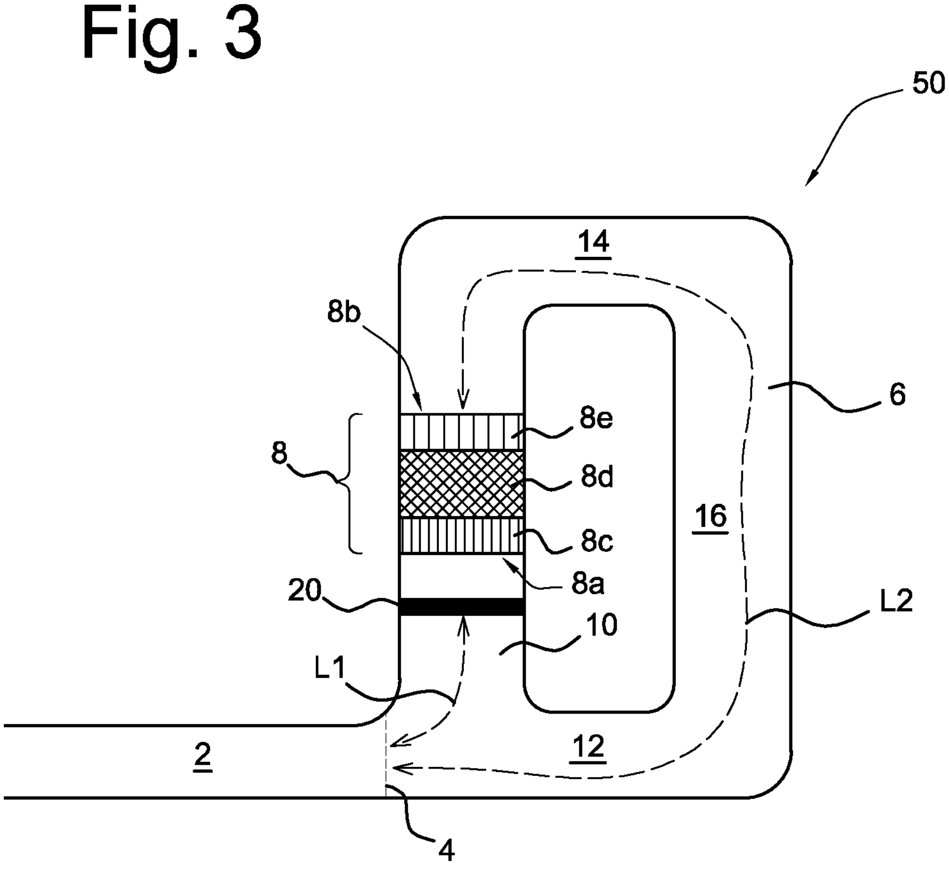
FIG. 3 shows a cross-section of a thermoacoustic device according to an embodiment of the invention.

FIG. 1 shows a cross-section of the thermoacoustic device in accordance with the prior art.

The thermoacoustic device 100 according to the prior art comprises a resonance tube 2 that is configured at one connecting end or passage 4 with a loop shaped tube or loop 6. Within the loop a thermoacoustic core 8 is arranged. At the connecting end the resonance tube 2 branches into a first leg 10 and second leg 12 that extend to a first side 8*a* and a second side 8*b* of the thermoacoustic core 8, respectively. The thermoacoustic core 8 is positioned "off-center in the loop", i.e., the loop connects the thermoacoustic core 8 and the passage 4 via two separate paths: the first side 8*a* of the thermoacoustic core 8 is arranged at an end of the first leg 10 at a first path length L1 (indicated by dashed line) between the thermoacoustic core 8 and the connecting passage 4. The second side 8*b* of the thermoacoustic core 8 is arranged at an end of the second leg 12 at a second path length L2 (indicated by dashed line) between the thermoacoustic core 8 and the connecting passage 4.

The loop 6 acts as an acoustic circuit with a process volume V which is filled with a working fluid, for example a pressurized gas such as helium. The working pressure can be about 5 MPa (50 atm), for example.

Within the acoustic circuit, in the second leg 12 adjacent to the thermoacoustic core 8 a compliance volume 14 and an inertance volume (or: inertance tube) 16 are defined as explained above. The compliance volume 14 is defined to be positioned between the thermoacoustic core 8 and the inertance volume 16.

Typically, the thermoacoustic core 8 comprises a cold heat exchanger 8*c*, a regenerator 8*d*, and a hot heat exchanger 8*e*. The skilled in the art will appreciate that in the drawing the case of a heat pump is depicted. In case of an acoustic engine the position of the hot and cold heat exchangers is reversed. In this regard, "cold heat exchanger" and "hot heat exchanger" refer to the relative temperature of the respective heat exchangers during use: in use, the cold heat exchanger will have a lower temperature than the temperature of the hot heat exchanger.

The thermoacoustic core 8 may be part of either a thermoacoustic engine configuration, a thermoacoustic heat pump configuration, or a thermoacoustic cooler configuration.

The regenerator 8*d* is placed between the cold heat exchanger 8*c* and the hot heat exchanger 8*e*. Next to the hot heat exchanger 8*e* on a second side facing away from the regenerator unit 8*d*, a thermal buffer zone (not shown) may be arranged.

FIG. 2 shows an impedance analogy of a prior art thermoacoustic device 100 in accordance with FIG. 1.

In its simplest form, a traveling wave thermoacoustic device 100 as explained with reference to FIG. 1 is visualized by its impedance analogy 101 which schematically shows an electric network.

The electric network comprises a resistance R, an inductance L and a capacitance C.

The regenerator unit of the thermoacoustic device is characterized mainly by the resistance R. The compliance and the inertance of the gas volume are characterized by a capacitance C and an inductance L, respectively.

The resistance R is arranged in parallel with the inductance L between a first node N1 and a second node N2 in the network. The parallel combination of the resistance R and the inductance L is connected in series with the capacitance C at the second node N2.

FIG. 3 shows a cross-section of a thermoacoustic device 50 according to an embodiment of the invention.

In FIG. 3 entities with the same reference number as shown in the preceding FIGS. 1-2 refer to corresponding or similar entities.

The thermoacoustic device 100 according to the invention comprises a loop shaped tube or loop 6 that is configured with an opening or passage 4. Within the loop a thermoacoustic core 8 is arranged. At the passage 4 the connecting tube 2 branches into a first leg 10 and second leg 12 that extend to a first side 8*a* and a second side 8*b* of the thermoacoustic core 8. A structure (not shown) is connected to the loop via the connecting tube 2. The thermoacoustic core 8 is positioned "off-center in the loop", i.e., the loop connects the thermoacoustic core 8 and the passage 4 via two separate paths: the first side 8*a* of the thermoacoustic core 8 is arranged at an end of the first leg 10 at a first path length L1 between the thermoacoustic core 8 and the connecting passage 4. The second side 8*b* of the thermoacoustic core 8 is arranged at an end of the second leg 12 at a second path length L2 between the thermoacoustic core and the connecting passage 4.

In this arrangement, the first path length L1 is relatively shorter than the second path length L2. Optionally, the first path length L1 substantially corresponds to the second path length L2.

The structure that is connected to the loop may comprise a resonance tube, or a resonator equipped with a driver, for example a mechanical driver such a piston, mass-spring mechanical resonator or a piston compressor.

In this embodiment, the thermoacoustic device 50 is similar to the thermoacoustic device 100 as shown in FIG. 1, but additionally comprises a spring-type partitioning element 20 that is arranged within the first leg 10 of the loop 6 between the thermoacoustic core 8 and the connecting passage 4. The spring-type partitioning element 20 is configured to block flow of gas through the element 20. In other words, the spring-type partitioning element 20 is designed to be impermeable for gas. In addition, the spring-type partitioning element 20 has mechanical properties in accordance with a spring element to allow transmission of pressure waves through the element 20.

As a result, the spring-type partitioning element 20 is configured to enforce relatively larger volume flows through the regenerator 8 without adding gas volume to the device in comparison with the thermoacoustic device 100 according to the prior art. Besides increasing the volume velocities and therewith power density, the spring-type partitioning element 20 also improves the phasing between pressure and velocity and therefore has a beneficial effect on the efficiency as well.

Advantageously, the application of a spring-type partitioning element 20 results in a thermoacoustic device 50 that can be kept compact, has a relatively higher power density and improved efficiency.

Also, the spring-type partitioning element provide that DC flow in the travelling wave engine or heat pump is suppressed. Convective heat losses in the thermal buffer zone will be lowered by the additional thermal resistance of the partitioning element.

The impedance analogy of a possible implementation of the thermoacoustic device 50 according to the embodiment of FIG. 3 is illustrated in more detail with reference to FIG. 4.

Figure 4:
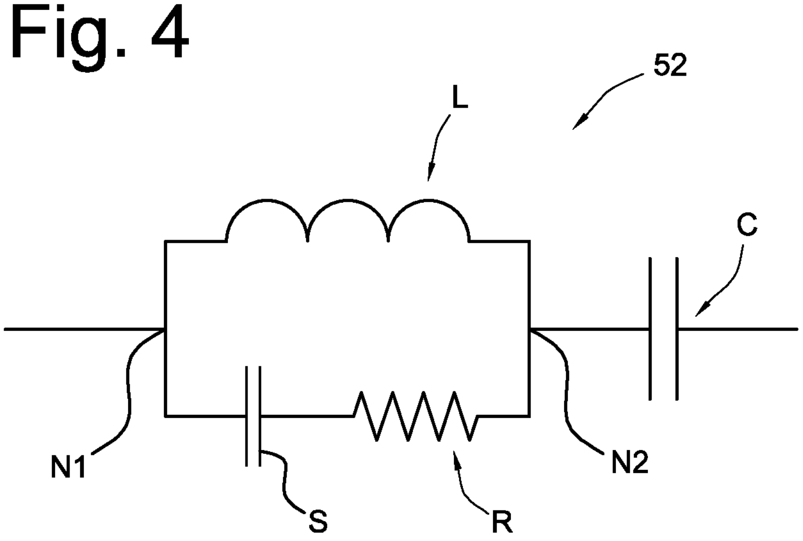
FIG. 4 shows an impedance analogy of the thermoacoustic device of FIG. 3.

FIG. 4 shows an impedance analogy 52 of the thermoacoustic device 50 of FIG. 3. In the impedance analogy the thermoacoustic device is visualized by a schematic electric network.

Similar to the electric network shown in FIG. 2, the electric network comprises a resistance R, an inductance L and a capacitance C, in which the resistance R corresponds with the resistance of the regenerator 8, the inductance L with the inertance volume 16 and the capacitance with the compliance volume 14, respectively. The resistance R is arranged in parallel with the inductance L between a first node N1 and a second node N2. The parallel combination of the resistance R and the inductance L is connected in series with the capacitance C at the second node N2.

According to the embodiment of the invention shown in FIG. 3, the impedance analogy additionally comprises a second capacitance S.

The second capacitance S is arranged in series with the resistance R, between the resistance R and the first node N1.

The second capacitance S at this position in the electric network corresponds with the compliance added by the spring-type partitioning element 20 in the first leg 10 of the loop 6.

Figure 5:
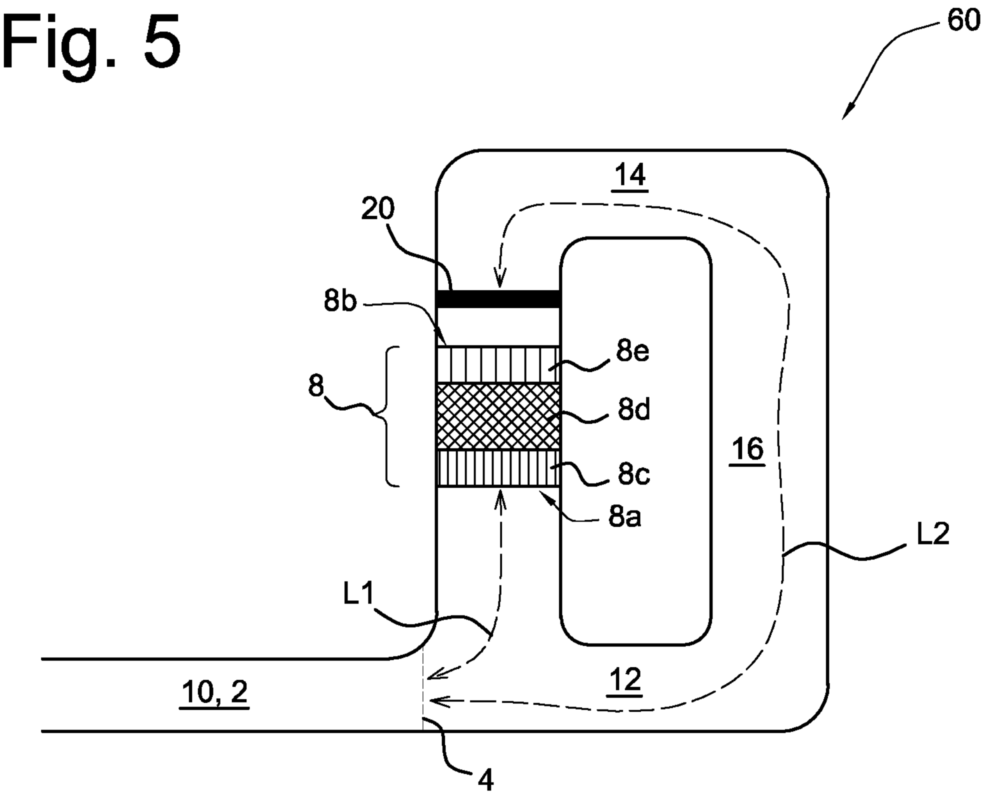
FIG. 5 shows a cross-section of a thermoacoustic device according to an embodiment of the invention.

FIG. 5 shows a cross-section of a thermoacoustic device according to an embodiment of the invention.

In FIG. 5 entities with the same reference number as shown in the preceding FIGS. 1-4 refer to corresponding or similar entities.

According to the embodiment shown in FIG. 5, the spring-type partitioning element is arranged in the second leg of the loop near the second side of the thermoacoustic core, between the thermoacoustic core and the location of the compliance volume.

In this position the spring-type partitioning element still enhances the acoustic circuit in comparison with the acoustic circuit from the prior art, but may be less effective than in the position within the first leg as shown in FIGS. 3 and 4.

An optimal magnitude of the spring constant of the spring-type partitioning element is depending on the acoustic parameters of the system (compliances, inertance, resistance of the regenerator) but also on the temperature ratio across the regenerator.

In a preferred position (as shown in FIG. 3), the magnitude of the spring constant of the spring-type partitioning element is mainly determined by the magnitude of the inertance and the temperature ratio across the regenerator. Detailed analysis with thermoacoustic design software (e.g. Delta EC software) can be applied to determine an optimal spring constant value of the spring-type partitioning element.

Furthermore, since a zero-mass spring does not exist under practical circumstances, the magnitude of the spring constant of the spring-type partitioning element needs to be adjusted by taking the mass of the spring-type partitioning element 20 into account. The resonant spring constant (belonging to the mass of the spring-type partitioning element) has to be added to the optimal spring constant value of the zero-mass spring to obtain an optimal spring constant value for a spring-type partitioning element with a specific mass.

Figure 6:
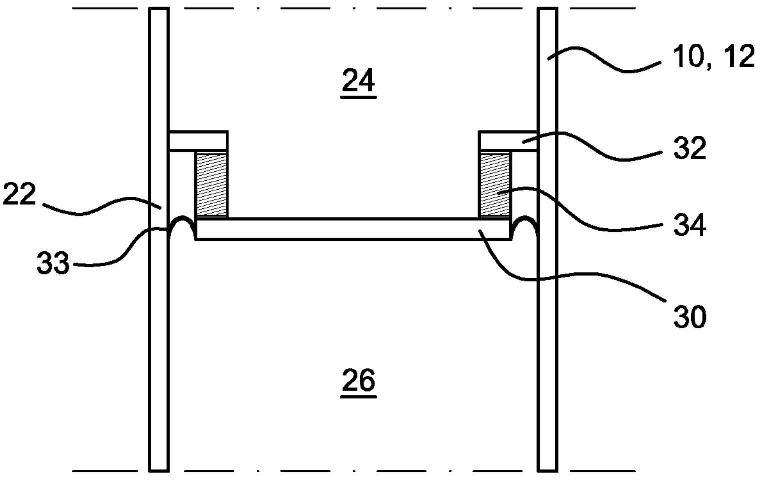
FIG. 6 shows a cross-section of a spring-type partitioning element in accordance with an embodiment of the invention.

FIG. 6 shows a cross-section of a spring-type partitioning element 20 in accordance with an embodiment of the invention.

The spring-type partitioning element 20 according to this embodiment is designed to cover the cross-section of the first leg 10 or alternatively the cross-section of the second leg 12 of the loop and to attach entirely to the wall 22 of the respective leg portion at the level of the covered cross-section. In this manner, the first or second leg portion 10; 12 is divided in two sub-volumes 24, 26 separated from each other. The division prevents flow of the working fluid between the two sub-volumes, but at the same time allows transmission of pressure waves through the spring-type partitioning element 20 between the two sub-volumes.

As shown in FIG. 6, the spring-type partitioning element 20 comprises a central section 30 and an outer (annular) section 32 joined to a circumference of the central section by means of a spring or spring arrangement 34. The outer annular section 32 is to be attached to the wall 22 of the first leg portion 10 or alternatively the wall of the second leg portion 12. A flexible seal 33 is placed in the annular section to avoid gas flowing through the partitioning element.

Preferably the central section 30 has a planar shape, but could have a different shape, for example convex or concave.

According to an embodiment, the plane of the central section 30 is displaced in perpendicular direction relative to the level of outer section 32 of the spring-type partitioning element 20 with the spring or spring arrangement 34 located in between the levels of the central section 30 and the outer section 32. The spring or spring arrangement 34 is configured to allow movement of the central section 30 in a direction transverse to the plane of the outer section 32.

When the spring-type partitioning element 20 is mounted in the first (or second) leg portion, the central section 30 will be allowed to move in the direction parallel to the (local) length of the leg portion.

It is noted that in this embodiment, the spring-type partitioning element 20 has a shape that substantially matches of its location in the cross-section of the leg portion 10; 12, for covering and closing off the cross-section.

Figure 7:
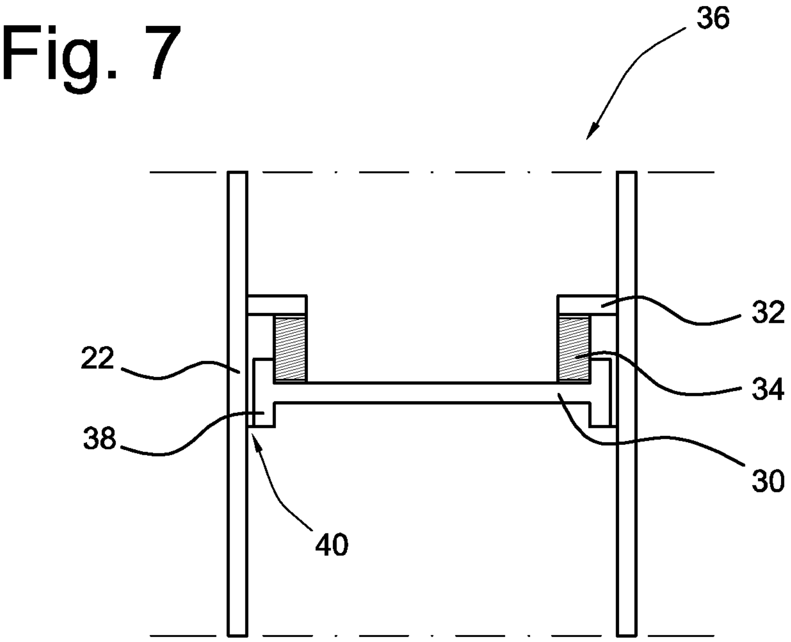
FIG. 7 shows a cross-section of a spring-type partitioning element in accordance with an embodiment of the invention.

FIG. 7 shows a cross-section of a spring-type partitioning element 36 in accordance with an embodiment of the invention.

In FIG. 7 entities with the same reference number as shown in the preceding FIG. 6 refer to corresponding or similar entities.

The spring-type partitioning element 36 according to this embodiment is similar to the spring-type partitioning element 20 shown in FIG. 6, and further comprises a collar shaped edge portion 38 that is attached around the circumference of the central section 30 of the spring-type partitioning element. A gap seal 40 is arranged between the edge portion and the wall 22 of the leg portion to improve the barrier function for closing off flow of the pressurized gas across the spring-type partitioning element.

Figure 8:
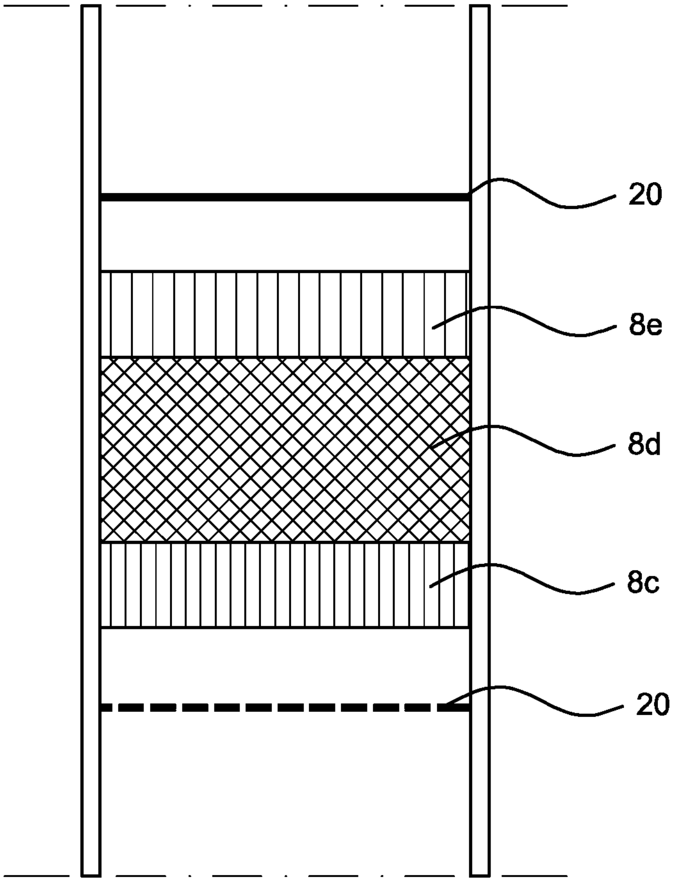
FIG. 8 shows a cross-section of a spring-type partitioning element consisting of a thin plate in accordance with an embodiment of the invention.

FIG. 8 shows a cross-section of a spring-type partitioning element consisting of an elastic membrane in accordance with an embodiment of the invention. The elastic membrane is tensioned in radial direction and closes of the cross section. The acoustic wave periodically stretches and deflects the membrane in the transverse direction to the external force exerted by the high acoustic pressure of the working fluid in the loop.

The type and thickness of the elastic material of the membrane is chosen such that the membrane obtains the correct spring constant.

The membrane has a stiffness that is significantly higher compared to the stiffness of a latex membrane which usually is used to block DC-flow. The required stiffness of the membrane depends on the system design (i.e. size of the system) and the operational conditions (i.e. system pressure). For relatively small systems with typical diameter of 0.07 m a Viton rubber type of membrane with a thickness of 0.5 mm could be used as partitioning element.

The invention has been described with reference to some embodiments. Obvious modifications and alterations will occur to the skilled in the art upon reading and understanding the preceding detailed description.

In addition, modifications may be made to adapt a particular layout or a material to the teachings of the invention without departing from the scope thereof. In particular, combinations of specific features of various aspects of the invention may be made. An aspect of the invention may be further advantageously enhanced by adding a feature that was described in relation to another aspect of the invention.

Therefore, it is intended that the invention not be limited to the particular embodiments disclosed, but that the invention includes all modifications insofar as they come within the scope of the appended claims.

The invention claimed is:

1. A thermoacoustic device for transfer of energy by an acoustic wave, the device comprising:

- a process volume, the process volume being filled with a working fluid through which the acoustic wave propagates,
- an acoustic network comprising a loop configured with a passage; the loop being a tube configured as an acoustic circuit provided with a compliance volume, an inertance volume, and a thermoacoustic core; the passage providing an opening in the loop spaced apart from the thermoacoustic core;
- wherein the loop connects the thermoacoustic core and the passage via two separate paths;
- wherein a first side of the thermoacoustic core is at a first path length from the passage in one of the two paths, and a second side of the thermoacoustic core is at a second path length in the other of the two paths;
- wherein the thermoacoustic device comprises a partitioning element within the loop; the partitioning element being configured to close off the cross-section of the tube and to be impermeable to the working fluid; and
- wherein the partitioning element has a spring constant and comprises a first side and a second side, the first side is configured to receive the acoustic wave, the second side is configured to transmit pressure waves in the working fluid in response to the first side receiving the acoustic wave, and wherein the pressure waves are based on a value of the spring constant
- wherein the partitioning element comprises a central section and an outer section that is joined to a circumference of the central section by means of a spring arrangement; the outer section being attached to a wall of the loop and a flexible seal is arranged on the circumference of the central section.

2. The thermoacoustic device according to claim 1, wherein the partitioning element comprises a membrane or a plate that acts as a spring in response to force exerted by the acoustic wave in the working fluid.

3. The thermoacoustic device according to claim 1, wherein the partitioning element is arranged at a predetermined position between the thermoacoustic core and the passage.

4. The thermoacoustic device according to claim 1, wherein the partitioning element is arranged between the first side of the thermoacoustic core and the passage.

5. The thermoacoustic device according to claim 1, wherein the partitioning element is arranged either between the second side of the thermoacoustic core and the passage or adjacent the second side.

6. The thermoacoustic device according to claim 5, wherein a distance of the partitioning element from the second side of the thermoacoustic core is relatively shorter than the distance of the partitioning element from the passage.

7. The thermoacoustic device according to claim 1, wherein the thermoacoustic core at the second side thereof is adjacent to a location of the compliance volume, the compliance volume being defined between the thermoacoustic core and a location of the inertance volume, the inertance volume being defined between the compliance volume and the passage.

8. The thermoacoustic device according to claim 7, wherein the partitioning element is arranged between the second side of the thermoacoustic core and the location of the compliance volume.

9. The thermoacoustic device according to claim 1, wherein the partitioning element further comprises a collar shaped edge portion that is attached around the circumference of the central section, and is arranged with a gap seal between the edge portion and the wall of the loop.

10. The thermoacoustic device according to claim 1, wherein the first path length is relatively shorter than the second path length.

11. The thermoacoustic device according to claim 1, further comprising a regenerator, wherein a magnitude of the spring constant of the partitioning element is based on at least a magnitude of an inertance of the thermoacoustic device and a temperature ratio across the regenerator.

12. A method for manufacturing a thermoacoustic device for transfer of energy by an acoustic wave, the thermoacoustic device comprising a process volume, the process volume being filled with a working fluid through which the acoustic wave is to propagate, the process volume comprising an acoustic network comprising a loop configured with a passage; the loop being a tube configured as an acoustic circuit provided with a compliance volume, a thermoacoustic core arranged within the loop, an inertance volume and a thermoacoustic core; the passage providing an opening in the loop spaced apart from the thermoacoustic core;

- wherein the loop connects the thermoacoustic core and the passage via two separate paths;

wherein a first side of the thermoacoustic core is at a first path length from the passage in one of the two paths, and a second side of the thermoacoustic core is at a second path length in the other of the two paths;

wherein the method comprises:

providing a partitioning element configured to close off the cross-section of the tube and to be impermeable to the working fluid, wherein the partitioning element has a spring constant and comprises a first side and a second side, the first side is configured to receive the acoustic wave, the second side is configured to transmit pressure waves in the working fluid in response to the first side receiving the acoustic wave, and wherein the pressure waves are based on a value of the spring constant; and arranging the partitioning element within the loop wherein the partitioning element comprises a central section and an outer section that is joined to a circumference of the central section by means of a spring arrangement; the outer section being attached to a wall of the loop and a flexible seal is arranged on the circumference of the central section.

13. The thermoacoustic device according to claim 1, wherein the partitioning element is arranged to block flow of the gas where the partitioning element closes the cross-section of the tube.

14. The thermoacoustic device according to claim 1, wherein the partitioning element is arranged to increase velocity of the gas within the loop and to improve phasing between the acoustic wave and the velocity of the gas.

* * * * *